W. SCHELLER.
INTERNAL COMBUSTION ENGINE.
APPLICATION FILED NOV. 18, 1915.
1,207,799.
Patented Dec. 12, 1916.
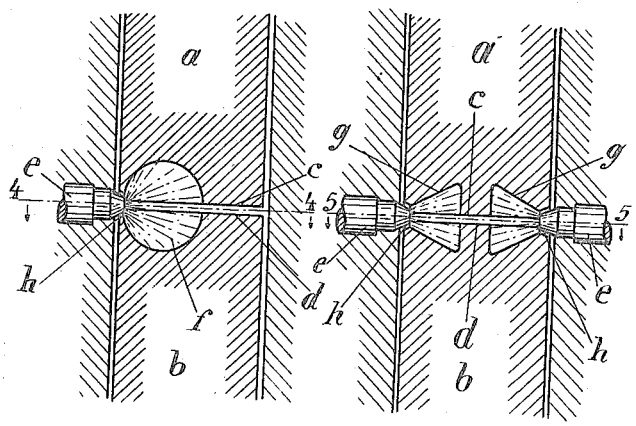
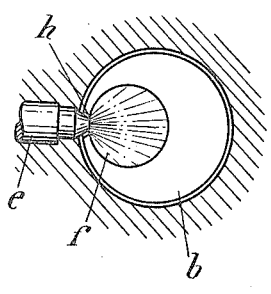
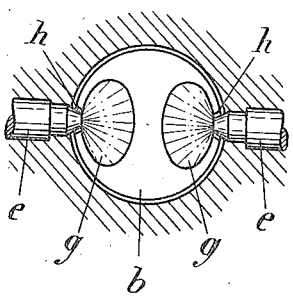
Inventor:
Wilhelm Scheller
per Martin Schmetz
Attorney.

UNITED STATES PATENT OFFICE.

WILHELM SCHELLER, OF AACHEN, GERMANY, ASSIGNOR TO HUGO JUNKERS, OF AACHEN, PRUSSIA, GERMANY.

INTERNAL-COMBUSTION ENGINE.

1,207,799. Specification of Letters Patent. Patented Dec. 12, 1916.

Application filed November 18, 1915. Serial No. 62,228.

*To all whom it may concern:*

Be it known that I, WILHELM SCHELLER, a subject of the King of Prussia, residing at No. 18 Victoriaallee, Aachen, in the Kingdom of Prussia, Empire of Germany, have invented certain new and useful Improvements in Internal-Combustion Engines; and I do hereby declare the following to be a full, clear, and exact description of the invention, such as will enable others skilled in the art to which it appertains to make and use the same.

The present invention relates to internal combustion engines and more especially to that kind of internal combustion engines which operate with oppositely moving pistons and in which liquid fuel is introduced by a fuel pump or by air compressed outside the engine cylinder, and wherein the combustion takes place during the injection (so-called slow-combustion engines).

My invention has for its object to provide an improved internal combustion engine of the kind described, wherein the liquid fuel is injected into the cylinder between the two oppositely moving pistons.

The objects of the invention more particularly consist in improving the utilization, atomization and vaporization of the liquid fuel and in protecting at the same time the cylinder wall from injurious influences of the hot gases of combustion, thereby increasing the durability of the cylinder and its security of working.

I attain these objects by making the two pistons of such length that their inner ends nearly come into contact with one another when the pistons are in their innermost position in the cylinder and by providing the ends or tops of one or both pistons with recesses which form a combustion chamber which is almost exclusively formed by the walls of the two pistons and the cross-section of which taken on a line vertical to the longitudinal axis of the cylinder is considerably smaller than the cross-section of the cylinder itself and which combustion chamber is not situated in the longitudinal central axis of the cylinder equidistant from all parts of cylinder wall, but eccentrically with relation to the same immediately in front of the mouth of the fuel valve and close to the cylinder wall. By reason of this construction, the wall of the combustion chamber lying opposite to the fuel-valve mouth and forming the most effective atomizing face for the fuel is arranged as near as possible to the fuel valve, so that the liquid fuel has to travel only a short distance before it strikes against the said wall of the combustion chamber and is atomized by the same.

In an engine constructed in accordance with the invention the liquid fuel injected into the combustion chamber will immediately strike against hot walls of the pistons, whereby it will be quickly atomized and vaporized, without coming into contact with the cooler walls of the cylinder and without having to traverse a large space before striking against the walls.

The invention is capable of embodiment in a variety of forms, some of which are illustrated in the accompanying drawing, in which—

Figures 1 and 2 are central longitudinal sections through the cylinders and pistons of double-piston engines; Figs. 3 and 4 are cross sections on the lines 4—4 and 5—5, respectively, of Figs. 1 and 2, looking in the direction of the arrows.

Referring now to the drawing, in which like letters of reference indicate like parts, *a* and *b* designate the two pistons which in all figures are shown at the inner ends of their strokes. In this position the parts *c* and *d* of the piston top-faces against which the fuel when injected does not strike, are very near each other so that the space inclosed by these surfaces and the inside of the cylinder wall is comparatively very small.

*e* are the injection valves which form part of the fuel supplying and introducing devices which may be of any well-known construction wherefore they are omitted on the drawing.

According to Figs. 1 and 3 the two pistons *a* and *b* are recessed at opposite points so as to form an eccentrically located approximately spherical or similarly shaped combustion chamber *f* which is situated eccentrically with relation to the cylinder axis immediately in front of the outlet mouth of a fuel valve *e* and close to the cylinder wall and into which the fuel is injected by means of the valve *e*. When injected the fuel uniformly distributes in the whole combustion chamber and strikes against the walls of the hemispherical recesses in the piston ends which walls thus form atomizing faces which aid in producing an intimate mixing of the fuel and air and hence in securing a complete combustion and as the combustion chamber is located eccentrically, the fuel has to travel only a short distance to reach the atomizing faces and this distance is independent of the diameter of the cylinder.

In the arrangement shown in Figs. 2 and 4, the inner ends of the pistons are formed so as to provide two combustion chambers $g$ the cross-section of which, as seen in Fig. 2, has approximately the form of a trapezoid. The walls lying opposite the fuel valves form atomizing faces for the fuel striking against the same when injected.

It is evident that the recesses illustrated in the drawing may at will be formed in both pistons or in one piston alone; the two pistons may also have differently shaped and differently located injection spaces. I, therefore, do not intend to restrict myself to the details of construction hereinbefore set forth and shown, but reserve the right to make such changes, variations and modifications as properly come within the scope of my invention.

What I claim as new and desire to secure by Letters Patent, is:—

An internal combustion engine comprising a cylinder, two pistons located therein and adapted to reciprocate in opposite directions simultaneously, said pistons being of such length that they nearly come into contact with each other when they are at the inner ends of their strokes and being provided with recesses in their faces which recesses form a combustion chamber when the pistons are in their inner position and a valve for injecting fuel into the combustion chamber, the combustion chamber being of much smaller size in a direction transverse to the axis of the cylinder than the diameter of the cylinder, having its walls almost exclusively formed by the pistons, and being located eccentrically with relation to the cylinder axis closely in front of the mouth of the said fuel injecting valve, as and for the purpose specified.

In testimony whereof I have signed my name to this specification in the presence of two subscribing witnesses.

WILHELM SCHELLER.

Witnesses:
ADOLF FRITZE,
CARL SCHMIDTZ.